United States Patent
Inoue

(10) Patent No.: US 7,419,178 B2
(45) Date of Patent: Sep. 2, 2008

(54) DRAW GEAR FOR INDUSTRIAL VEHICLE

(75) Inventor: Daisuke Inoue, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 153 days.

(21) Appl. No.: 11/388,261

(22) Filed: Mar. 24, 2006

(65) Prior Publication Data
US 2006/0242791 A1    Nov. 2, 2006

(30) Foreign Application Priority Data
Mar. 25, 2005   (JP)  ............................ P2005-087400

(51) Int. Cl.
*B60D 1/145*    (2006.01)
(52) U.S. Cl. ...................... 280/514; 280/515
(58) Field of Classification Search ................. 280/759, 280/504, 514, 515
See application file for complete search history.

(56) References Cited

U.S. PATENT DOCUMENTS

| | | | |
|---|---|---|---|
| 2,784,656 A * | 3/1957 | Sheppard | 172/274 |
| 6,286,854 B1 * | 9/2001 | Cross | 280/504 |
| 7,021,646 B1 * | 4/2006 | Cheng et al. | 280/495 |
| 2002/0145269 A1 * | 10/2002 | Carty | 280/504 |
| 2003/0006581 A1 * | 1/2003 | Moss et al. | 280/416.1 |
| 2004/0217571 A1 * | 11/2004 | Miyake et al. | 280/124.111 |
| 2004/0251660 A1 * | 12/2004 | Roe et al. | 280/515 |
| 2005/0236810 A1 * | 10/2005 | Sorgi | 280/504 |
| 2007/0052207 A1 * | 3/2007 | Olson | 280/515 |
| 2008/0100034 A1 * | 5/2008 | Maillet | 280/515 |

FOREIGN PATENT DOCUMENTS

| | | |
|---|---|---|
| GB | 1 200 061 | 7/1970 |
| JP | 53-143312 | 11/1978 |
| JP | 60236811 A * | 11/1985 |
| JP | 11-322286 | 11/1999 |

* cited by examiner

*Primary Examiner*—Kevin Hurley
*Assistant Examiner*—Karen Amores
(74) *Attorney, Agent, or Firm*—Morgan & Finnegan, LLP

(57) ABSTRACT

A draw gear has a drawbar space formed in a rear part of a counterweight of a industrial vehicle. A drawbar is installed in the drawbar space. An upper section positioning portion is provided in the drawbar space for allowing the drawbar to be moved in a first direction in which the drawbar is drawn and also for positioning the drawbar in a second direction opposite to the first direction. A middle section positioning portion is provided in the drawbar space for allowing the drawbar to be moved in the second direction and also for positioning the drawbar in the first direction. A lower section positioning portion is provided in the drawbar space for positioning the drawbar at least in the second direction. An opening is formed at least on an upper side of the drawbar space for allowing the drawbar to be drawn out of the counterweight.

9 Claims, 9 Drawing Sheets

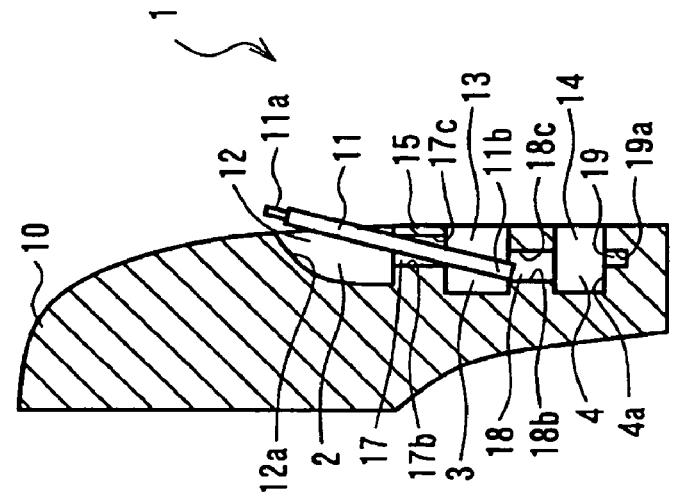
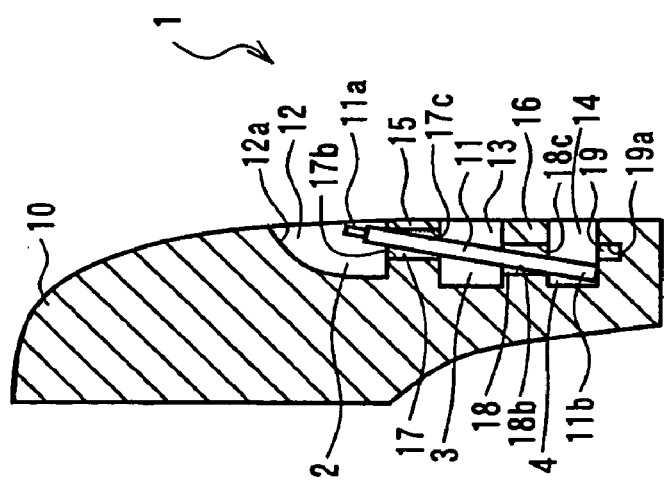
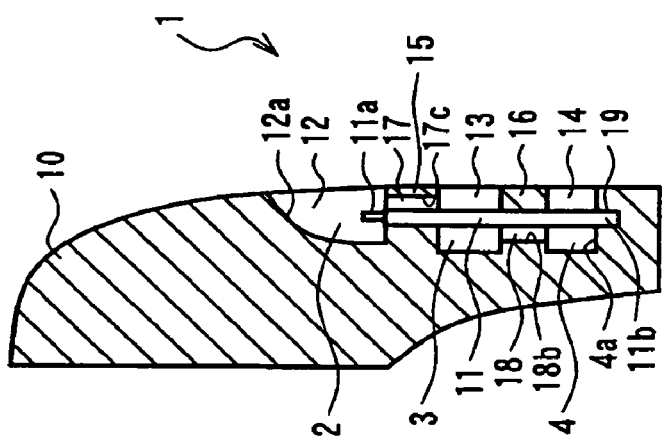

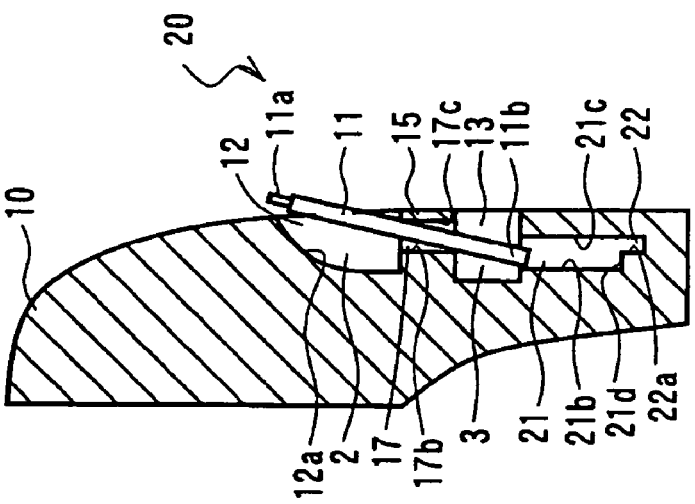
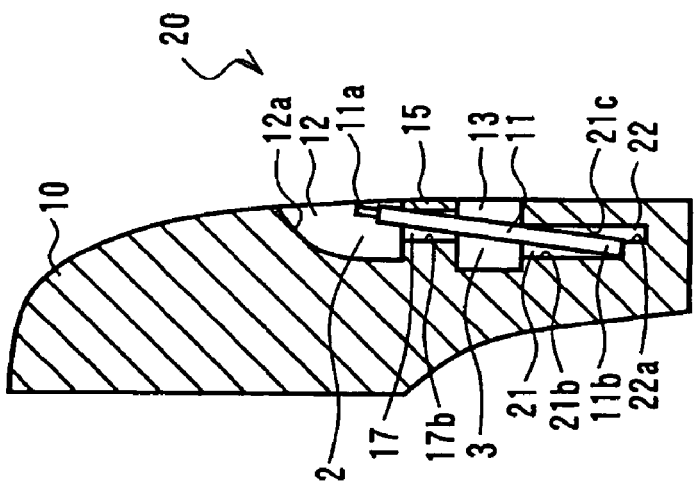
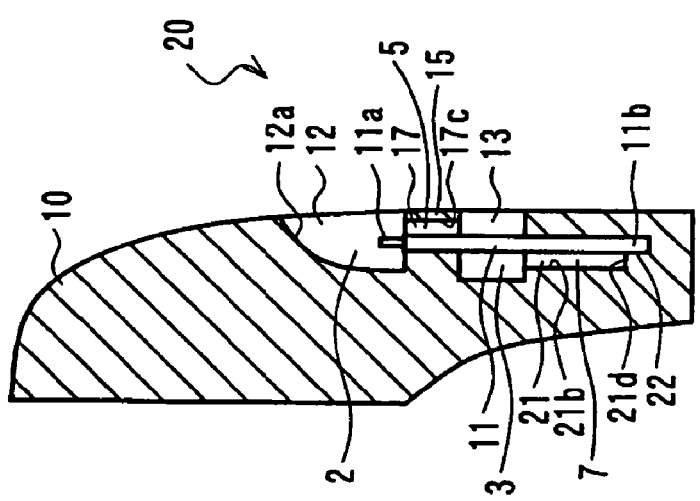

DRAW GEAR FOR INDUSTRIAL VEHICLE

BACKGROUND OF THE INVENTION

The present invention relates to a draw gear for an industrial vehicle such as a forklift truck.

The Japanese Utility Model Application Publication (KO-KAI) No. 53-143312 discloses a draw gear for a forklift truck, wherein its counterweight is made having a part protruding rearward and the protruding rear part of the counterweight has an opening formed therein and upper and lower protrusions are formed on the top and bottom sides of the opening. The upper and lower protrusions of the counterweight have formed therethrough vertically extending holes through which a drawbar is inserted. These two drawbar insertion holes are enlarged in the portions thereof adjacent to the opening so as to permit the drawbar to be inserted into or drawn out from the holes in an oblique direction in installation or removal of the drawbar. In addition, a stop plate is provided above the counterweight for preventing drawbar from being slipped off the holes.

In the above prior art draw gear, however, since the length of the forklift truck body is increased rearward due to the protruding shape of the counterweight and therefore rear wheels of the forklift truck body are provided rearward, a turning radius of the forklift truck is increased thereby to degrade the maneuverability of the forklift truck. In addition, since the top portion of the counterweight above the protrusion is cut off in a large quantity to provide a space for the stop, the weight of the counterweight is reduced accordingly and, therefore, the load handling capacity of the forklift truck is reduced, thereby degrading the performance of the forklift truck. In order to prevent the performance degradation of the forklift truck, the counterweight needs to be enlarged, which will inevitably increase the body of the forklift truck. As stated earlier, two drawbar insertion holes formed in the protrusions are enlarged in the portions thereof adjacent to the opening to permit the drawbar to be inserted into or drawn out from the insertion holes. In order for the drawbar to be inserted in oblique direction into the holes smoothly, at least the upper insertion hole of the two holes needs to be formed large in size. If the insertion hole is made larger, the drawbar fitted in the holes will be supported only in an unstable manner.

SUMMARY OF THE INVENTION

The present invention is directed to a draw gear for an industrial vehicle capable of reliably supporting a drawbar by a simple structure without degrading the performance of the industrial vehicle.

In accordance with an aspect of the present invention, a draw gear for an industrial vehicle includes a drawbar space, a drawbar, an upper section positioning portion, a middle section positioning portion and a lower section positioning portion. The drawbar space is formed in a rear part of a counterweight of the industrial vehicle. The drawbar is installed in the drawbar space. The upper section positioning portion is provided in the drawbar space for allowing the drawbar to be moved in a first direction in which the drawbar is drawn and also for positioning the drawbar in a second direction opposite to the first direction. The middle section positioning portion is provided in the drawbar space for allowing the drawbar to be moved in the second direction and also for positioning the drawbar in the first direction. The lower section positioning portion is provided in the drawbar space for positioning the drawbar at least in the second direction. An opening is formed at least on an upper side of the drawbar space for allowing the drawbar to be drawn out of the counterweight.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description, together with the accompanying drawings, in which:

FIG. 2A is a sectional side elevation taken on the line A-A of FIG. 1 in the state where a drawbar is fitted in a drawbar space;

FIG. 2B is a sectional side elevation taken on the line A-A of FIG. 1 in the state where the drawbar is drawn from the drawbar space;

FIG. 2C is a sectional side elevation taken on the line A-A of FIG. 1 in the state where the drawbar is drawn from the drawbar space;

FIG. 5A is a sectional side elevation taken on the line B-B of FIG. 4 in the state where a drawbar is fitted in a drawbar space;

FIG. 5B is a sectional side elevation taken on the line B-B of FIG. 4 in the state where the drawbar is drawn from the drawbar space;

FIG. 5C is a sectional side elevation taken on the line B-B of FIG. 4 in the state where the drawbar is drawn from the drawbar space;

DETAILED DESCRIPTION OF THE PREFERRED EMBODIMENTS

The following will describe a draw gear for an industrial vehicle according to a first preferred embodiment of the present invention with reference to FIGS. 1, 2A-2C and 3A-3C.

Figure 1:
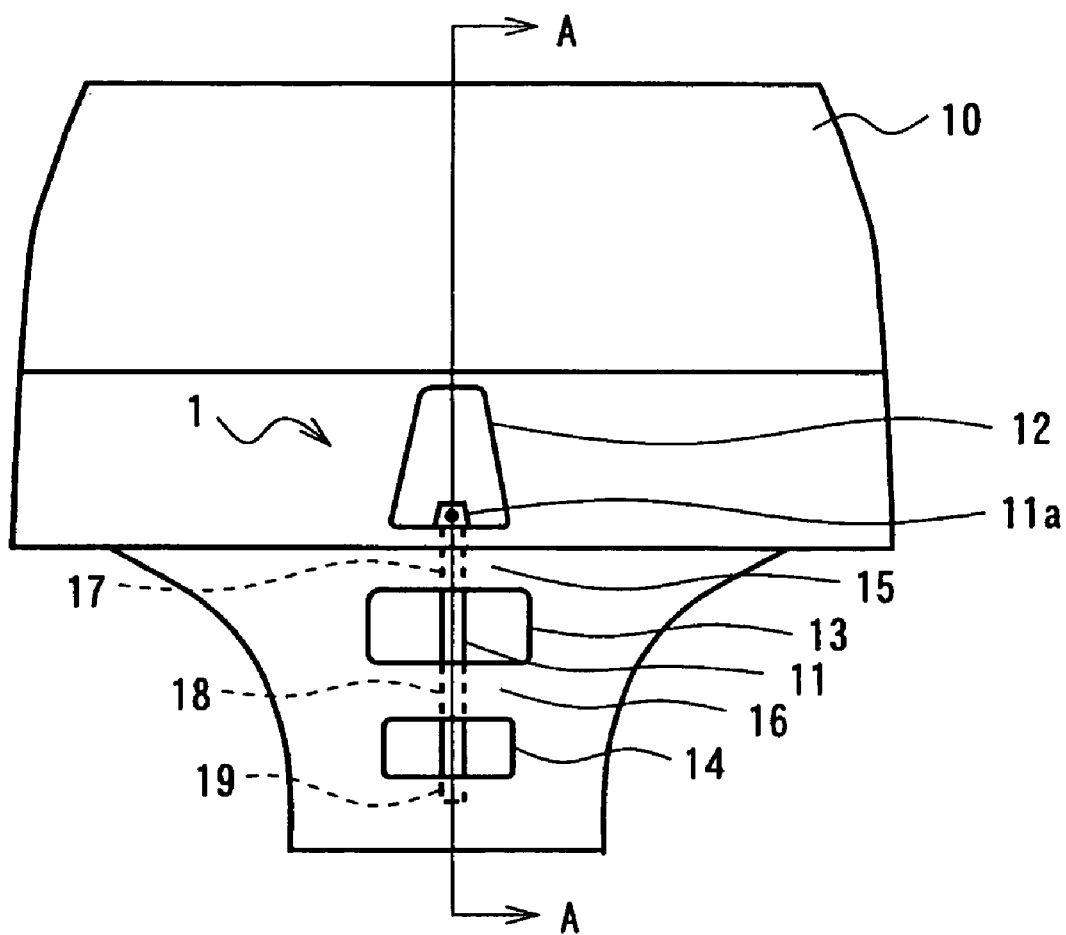
FIG. 1 is a rear view showing a counterweight according to a first preferred embodiment of the present invention.

FIG. 1 shows a draw gear 1 formed in a counterweight 10 provided in the rear of a forklift truck. As more clearly shown in FIGS. 2A to 2C, the counterweight 10 has formed in the rear part thereof a drawbar space in which a drawbar 11 is installed. The drawbar space includes three spaces 2, 3, 4 arranged in this order as seen from the top of the counterweight 10 downward. The drawbar space also includes protrusions 15, 16 having elongated holes 17, 18 formed therein, respectively.

The space 2 is provided in the form of a recessed groove having a top wall surface 12a with an arch shape in cross section and progressively increasing depth toward its adjacent elongated hole 17. The space 2 has an opening 12 which permits the drawbar 11 to be drawn out of the counterweight 10. The space 3 is provided in the form of a recessed groove having a rectangular shape in cross section and located below the space 2 at a predetermined spaced interval therefrom. The space 3 has an opening 13 which is exposed to the outside of the counterweight 10. The space 4 is also provided in the form of a recessed groove having a rectangular shape in cross section and a bottom surface 4a and located below the space 3 at a predetermined spaced interval therefrom. The space 4 also has an opening 14 which is exposed to the outside of the counterweight 10.

When drawing the forklift truck, a drawing hook (not shown) is inserted through the opening 13 or 14 into the spaces 3 or 4 to hook the drawing hook on the drawbar 11. The drawbar 11 is a substantially round bar having a substantially cylindrical cross section and has a head 11a on its top end. As seen in FIG. 1, the head 11a is formed in a flat shape with a round hole formed at the center thereof and protrudes outwards further than the outer peripheral surface of the round bar.

Figure 3C:
FIG. 3C is an illustrative view showing a closed-end round hole providing a lower section positioning portion according to the first preferred embodiment of the present invention.
Figure 3B:
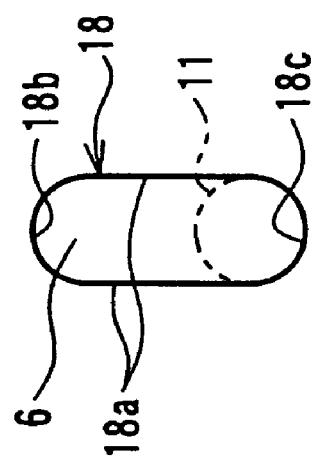
FIG. 3B is an illustrative view showing an elongated hole providing a middle section positioning portion according to the first preferred embodiment of the present invention.
Figure 3A:
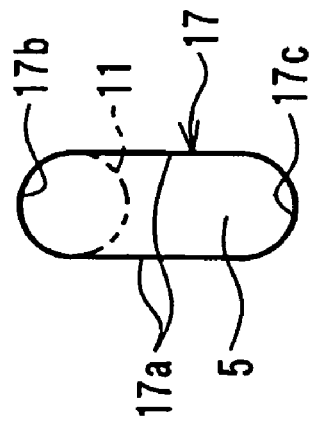
FIG. 3A is an illustrative view showing an elongated hole providing an upper section positioning portion according to the first preferred embodiment of the present invention.

The protrusion 15 is formed between the openings 12 and 13, and the elongated hole 17 has a substantially elliptical shape in cross section, as shown in FIG. 3A, and extends vertically through the protrusion 15. The protrusion 16 is formed between the openings 13 and 14, and the elongated hole 18 has also a substantially elliptical shape in cross section, as shown in FIG. 3B, and extends vertically through the protrusion 16. The elongated holes 17, 18 are not formed in alignment with each other, but the hole 18 is located in offset relation to, or forward of the hole 17, as seen from, for example, FIG. 2A. A substantially round hole 19 having a closed end is formed in the bottom surface 4a of the space 4 below the elongated hole 18. The round hole 19 will be hereinafter referred to as a closed-end round hole.

FIGS. 3A, 3B and 3C are illustrative views of the elongated holes 17, 18 and the closed-end round hole 19 as seen from the top, providing the upper, middle and lower section positioning portions, which will be described later, respectively. The top in the drawings corresponds to the front side and the bottom to the rear side of the vehicle, respectively, and the three holes 17, 18 and 19 are illustrated at correct positions relative to each other as viewed in the longitudinal direction of the vehicle.

As shown in FIG. 3A, the elliptical elongated hole 17 is defined by long-side portions 17a and semicircular portions 17b, 17c which are formed at the opposite ends of the long-side portions 17a. The upper section positioning portion is provided by the semicircular portion 17b which allows the drawbar to be moved in a direction in which the drawbar is drawn. The semicircular portion 17b also positions the drawbar in a direction opposite to the direction in which the drawbar is drawn. Space 5 provided in the elongated hole 17 allows part of the drawbar 11 in the hole 17 to be moved rearward of the vehicle for its removal out from the counterweight 10. The long-side portions 17a of the elongated hole 17 restrict the movement of the drawbar 11 in the direction that intersects with the general direction in which the drawbar 11 is drawn out of the counterweight 10.

Then referring to FIG. 3B, the elliptical elongated hole 18 is defined by long-side portions 18a and semicircular portions 18b, 18c which are formed at the opposite ends of the long-side portions 18a. The middle section positioning portion is provided by the semicircular portion 18c which allows the drawbar to be moved in the direction opposite to the direction in which the drawbar is drawn. The semicircular portion 18c also positions the drawbar in the direction in which the drawbar is drawn. Space 6 provided in the elongated hole 18 allows part of the drawbar 11 in the hole 18 to be moved forward of the vehicle when removing the drawbar 11 out from the counterweight 10. The long-side portions 18a of the elongated hole 18 perform the same function as the long-side portions 17a of the elongated hole 17.

As shown in FIG. 3C, the closed-end round hole 19 is a hole in which an axial end 11b of the drawbar 11 is fitted. The closed-end round hole 19 has an inner peripheral surface 19a forming the lower section positioning portion which serves to locate the drawbar 11 in its upright position as shown in FIG. 2A. Therefore, when the axial end 11b of the drawbar 11 is fitted into the closed-end round hole 19, the drawbar 11 is fitted and completely positioned in the drawbar space.

The following will describe the operation of the above-described draw gear 1 for the industrial vehicle. In removing the drawbar 11 from the state of FIG. 2A where the drawbar 11 is fitted in the drawbar space, firstly the head 11a of the drawbar 11 is pulled upward by hand. By so doing, the axial end 11b of the drawbar 11 is removed out of the closed-end round hole 19, so that the drawbar 11 is allowed to incline rearward of the counterweight 10 as shown in FIG. 2B. At this time, the part of the drawbar 11 which was in contact with the semicircular portion 17b of the elongated hole 17 is moved rearward toward the space 5, and the part of the drawbar 11 which was in contact with the semicircular portion 18c of the elongated hole 18 is moved forward toward the space 6, and the axial end 11b of the drawbar 11 is moved forward in the space 4 thereby to cause the head 11a of the drawbar 11 to tilt rearward. Subsequently, the drawbar 11 is lifted by hand obliquely upward, as shown in FIG. 2C. During lifting the drawbar 11, the axial end 11b of the drawbar 11 is passed through the elongated hole 18 and the head 11a of the drawbar 11 is moved out of the counterweight 10 without being brought into contact with the top wall surface 12a of the opening 12. Thus, the drawbar 11 is drawn from the drawbar space.

When inserting the drawbar 11 into the drawbar space, on the other hand, the axial end 11b of the drawbar 11 is inserted by hand into the elongated hole 17 from a position above and obliquely rearward of the opening 12. During inserting the drawbar 11 into the hole 17, the workman can hold the drawbar 11 at its head 11a by hand. Inserting the drawbar 11 obliquely further than the elongated hole 17, the axial end 11b of the drawbar 11 passes through the elongated hole 17 and is then inserted into the elongated hole 18. Further inserting the drawbar 11 into the elongated hole 18, the axial end 11b of the drawbar 11 reaches the space 4 in the lower end of the counterweight 10 and is then stopped in contact with the bottom surface 4a in the space 4, thus the drawbar 11 being held in the obliquely inclined state. The head 11a of the drawbar 11 is inserted into the space 2 without being brought into contact with the top wall surface 12a.

Then, the drawbar 11 is placed in upright position with the outer peripheral surface of the drawbar 11 set in contact with the semicircular portion 17b of the elongated hole 17 and also with the semicircular portion 18c of the elongated hole 18. By so doing, positioning of the drawbar 11 in longitudinal direction of the counterweight 10 can be accomplished. With the drawbar 11 kept in its upright position, the head 11a of the drawbar 11 is pushed downward to make the axial end 11b to be fitted into the closed-end round hole 19, thus the positioning and fitting of the drawbar 11 in the drawbar space being completed. The provision of the flat protruding portion in the head 11a which can be caught at the elongated hole 17 prevents the drawbar 11 from being dropped during the operation of fitting the drawbar 11 into the drawbar space.

When installing the drawing hook (not shown) on the drawbar 11, first of all, the drawbar 11 is removed by drawing it obliquely upward thereby to free the opening 13 or 14. Subsequently the drawing hook is inserted into the opening 13 or 14, and then the drawbar 11 is inserted into the drawbar space for connection with the drawing hook.

The draw gear 1 for the industrial vehicle of the present embodiment has the following beneficial effects.

(1) The draw gear 1 wherein the drawbar space formed in the rear of the counterweight 10 includes the spaces 2, 3, 4 arranged in this order as seen from the top of the counterweight 10 and further includes the protrusions 15, 16 having elongated holes 17, 18 formed therein, respectively, and the elongated holes 17, 18 are formed in an offset relation to each other, that is, the hole 18 is located forward of the hole 17 permits the drawbar 11 to be removed out of the drawbar space in the counterweight 10 by drawing obliquely upward and also to be installed in place by inserting obliquely from the top of the drawbar space. Thus, the counterweight 10 need not be hollowed deeply in forming the opening 12 in the upper space 2 and, therefore, the counterweight 10 is prevented from being large in size.

(2) The rear outer peripheral surface of the counterweight 10 is not so formed protruding outward, and the protrusions 15, 16 of the drawbar space do not protrude outward from the above rear outer peripheral surface of the counterweight 10, either. When fitted in the drawbar space, the drawbar 11 is positioned completely within the drawbar space without protruding from the above rear outer peripheral surface of the counterweight 10. Therefore, the increase of the turning radius of the forklift truck caused by the rearward protruding shape of the counterweight is prevented. Thus, the body of the forklift truck can be made compact.

(3) Since the draw gear 1 is made with minimum space, the counterweight 10 can perform its intended function.

(4) With the outer peripheral surface of the drawbar 11 set in contact with the semicircular portions 17b, 18c of the elongated holes 17, 18 of the protrusions 15, 16 in the rear of the counterweight 10, the drawbar 11 is positioned in longitudinal direction of the counterweight 10. In addition, with the axial end 11b of the drawbar 11 fitted in the closed-end round hole 19 formed in the lower end of the counterweight 10, the drawbar 11 is positioned completely and fitted in the drawbar space. Thus, the drawbar 11 is reliably supported by a simple and easy method.

(5) Inserting the drawing hook into the opening 13 and/or 14 and then inserting the drawbar 11 into the drawbar space for connection with the drawing hook, provision for drawing operation in emergency can be completed.

(6) The drawbar 11 which is made of a round bar is simple to handle. In addition, an existing drawbar is usable without modification and, therefore, a new drawbar need not be prepared.

(7) The provision of the flat protruding portion in the head 11a which can be caught at the elongated hole 17 prevents the drawbar 11 from being dropped during the operation of fitting the drawbar 11 into the drawbar space. In addition, even when the head 11a drops into the elongated hole 17 due to the vibration of the forklift truck, the head 11a is prevented from dropping out of the elongated hole 17 by the closed-end round hole 19. Thus, the drawbar 11 is reliably supported in the drawbar space.

Now, the following will describe a draw gear for an industrial vehicle according to a second preferred embodiment of the present invention with reference to FIGS. 4, 5A-5C and 6A-6C. The second embodiment is different from the first embodiment in that the space 4 of the drawbar space of the first preferred embodiment is eliminated. For the sake of convenience of description, the drawings for the second embodiment use like reference numerals or symbols to denote like parts or elements of the first embodiment. Explanation of the common structure will be omitted and the modified structure only will be explained.

Figure 4:
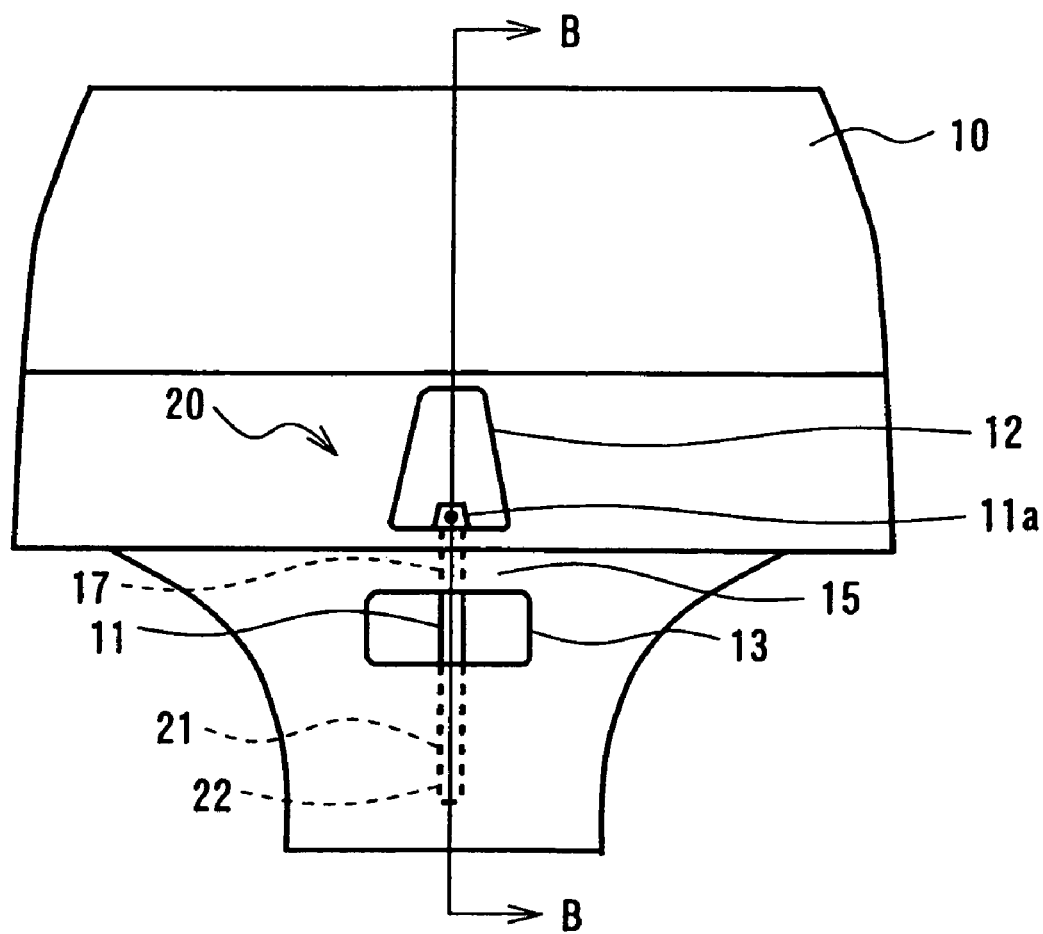
FIG. 4 is a rear view showing a counterweight according to a second preferred embodiment of the present invention.

FIG. 4 shows a draw gear 20 formed in the counterweight 10 provided in the rear of a forklift truck. As shown in FIGS. 5A to 5C, the counterweight 10 has formed in the rear part thereof a drawbar space in which a drawbar 11 is installed. The drawbar space includes the spaces 2, 3 arranged in this order as seen from the top of the counterweight 10 downward. The drawbar space also includes the protrusion 15 having a substantially elliptical elongated hole 17 formed therein.

The space 2 is provided in the form of a recessed groove having the top wall surface 12a with an arch shape in cross section and progressively increasing depth toward its adjacent elongated hole 17. The space 2 has the opening 12 which permits the drawbar 11 to be drawn out of the counterweight 10. The space 3 is provided in the form of a recessed groove having a rectangular shape in cross section and located below the space 2 at a predetermined spaced interval therefrom. The space 3 has the opening 13 which is exposed to the outside of the counterweight 10. When drawing the forklift truck, a drawing hook (not shown) is inserted through the opening 13 into the space 3 to hook the drawing hook on the drawbar 11.

The protrusion 15 is formed between the openings 12 and 13, and the elongated hole 17 is formed through this protrusion 15. A substantially elliptical elongated hole 21 is formed in the lower end of the counterweight 10 below the protrusion 15 in an offset relation to the elongated hole 17 or forward of the elongated hole 17. A closed-end round hole 22 is formed in the bottom surface in the elongated hole 21.

Figure 6A:
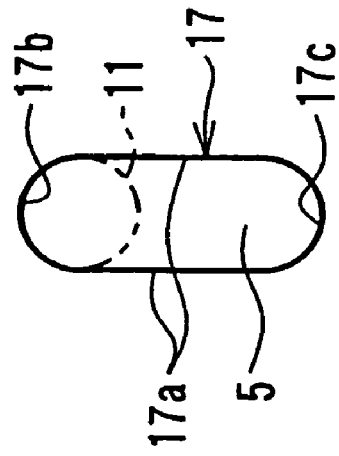
FIG. 6A is an illustrative view showing an elongated hole providing an upper section positioning portion according to the second preferred embodiment of the present invention.
Figure 6B:
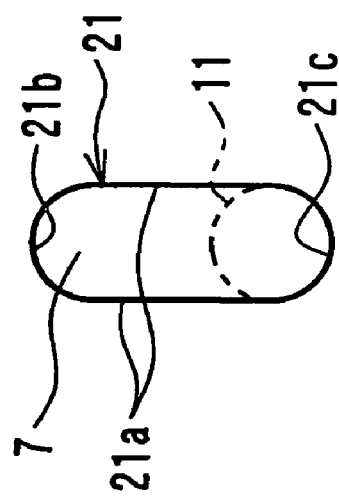
FIG. 6B is an illustrative view showing an elongated hole providing a middle section positioning portion according to the second preferred embodiment of the present invention.
Figure 6C:
FIG. 6C is an illustrative view showing a closed-end round hole providing a lower section positioning portion according to the second preferred embodiment of the present invention.

FIGS. 6A, 6B and 6C are illustrative views of the elongated holes 17, 21 and the closed-end round hole 22 as seen from the top, providing the upper, middle and lower section positioning portions, respectively. The top in the drawings corresponds to the front side and the bottom to the rear side of the vehicle, respectively, and the three holes 17, 21 and 22 are illustrated at correct positions relative to each other as viewed in the longitudinal direction of the vehicle.

As shown in FIG. 6A, the elliptical elongated hole 17 is defined by long-side portions 17a and semicircular portions 17b, 17c which are formed at the opposite ends of the long-side portions 17a. The upper section positioning portion is provided by the semicircular portion 17b which allows the drawbar to be moved in a direction in which the drawbar is drawn. The semicircular portion 17b also positions the drawbar in a direction opposite to the direction in which the drawbar is drawn. Space 5 provided in the elongated hole 17 allows part of the drawbar 11 in the hole 17 to be moved rearward of the vehicle for its removal out from the counterweight 10. The long-side portions 17a of the elongated hole 17 restrict the movement of the drawbar 11 in the direction that intersects with the general direction in which the drawbar 11 is drawn out of the counterweight 10.

As shown in FIG. 6B, the elongated hole 21 is defined by long-side portions 21a and semicircular portions 21b, 21c which are formed at the opposite ends of the long-side portions 21a. The middle section positioning portion is provided by the semicircular portion 21c which allows the drawbar to be moved in the direction opposite to the direction in which the drawbar is drawn. The semicircular portion 21c also positions the drawbar in the direction in which the drawbar is drawn. Space 7 provided in the elongated hole 21 allows part of the drawbar 11 in the hole 18 to be moved forward of the vehicle when removing the drawbar 11 out from the counterweight 10. The long-side portions 21a of the elongated hole 21 perform the same function as the long-side portions 17a of the elongated hole 17.

As shown in FIG. 6C, the closed-end round hole 22 is a hole in which the axial end 11b of the drawbar 11 is fitted. The closed-end round hole 22 has an inner peripheral surface 22a forming the lower section positioning portion which serves to locate the drawbar 11 in its upright position as shown in FIG. 5A. Therefore, when the axial end 11b of the drawbar 11 is fitted into the closed-end round hole 22, the drawbar 11 is fitted and completely positioned in the drawbar space.

The following will describe the operation of the above-described draw gear 20 for the industrial vehicle. In removing the drawbar 11 from the state of FIG. 5A where the drawbar 11 is fitted in the drawbar space, firstly the head 11a of the drawbar 11 is pulled upward by hand. By so doing, the axial end 11b of the drawbar 11 is removed out of the closed-end round hole 22, so that the drawbar 11 is allowed to incline rearward of the counterweight 10 as shown in FIG. 5B. At this time, the part of the drawbar 11 which was in contact with the semicircular portion 17b of the elongated hole 17 is moved rearward toward the space 5, and the part of the drawbar 11 which was in contact with the semicircular portion 21c of the elongated hole 21 is moved forward toward the space 7, and the axial end 11b of the drawbar 11 is moved forward in the space 7 with the drawbar 11 held on a bottom surface 21d of the elongated hole 21, thereby to cause the head 11a of the drawbar 11 to tilt rearward. Subsequently, the drawbar 11 is lifted by hand obliquely upward, as shown in FIG. 5C. During lifting the drawbar 11, the axial end 11b of the drawbar 11 is passed through the elongated hole 21 and the head 11a of the drawbar 11 is moved out of the counterweight 10 without being brought into contact with the top wall surface 12a of the opening 12. Thus, the drawbar 11 is drawn from the drawbar space.

When inserting the drawbar 11 into the drawbar space, on the other hand, the axial end 11b of the drawbar 11 is inserted by hand into the elongated hole 17 from a position above and obliquely rearward of the opening 12. During inserting the drawbar 11 into the hole 17, the workman can hold the drawbar 11 at its head 11a by hand. Inserting the drawbar 11 obliquely further than the elongated hole 17, the axial end 11b of the drawbar 11 passes through the elongated hole 17 and is then inserted into the elongated hole 21. Further inserting the drawbar 11 into the elongated hole 21, the axial end 11b of the drawbar 11 reaches the bottom surface 21d of the elongated hole 21 and the drawbar 11 is held in the obliquely inclined state. The head 11a of the drawbar 11 is inserted into the space 2 without being brought into contact with the top wall surface 12a.

Then, the drawbar 11 is placed in upright position with the outer peripheral surface of the drawbar 11 set in contact with the semicircular portion 17b of the elongated hole 17 and also with the semicircular portion 21c of the elongated hole 21. By so doing, positioning of the drawbar 11 in longitudinal direction of the counterweight 10 can be accomplished. With the drawbar 11 kept in its upright position, the head 11a of the drawbar 11 is pushed downward to make the axial end 11b to be fitted into the closed-end round hole 19, thus the positioning and fitting of the drawbar 11 in the drawbar space being completed.

When installing the drawing hook (not shown) on the drawbar 11, first of all, the drawbar 11 is removed by drawing it obliquely upward thereby to free the opening 13. Subsequently, the drawing hook is inserted into the opening 13, the drawbar 11 is inserted into the drawbar space for connection with the drawing hook.

The draw gear 20 for the industrial vehicle of the second embodiment has the following beneficial effect in addition to the aforementioned effects (1) to (7).

(8) The drawbar space formed in the rear part of the counterweight 10 in the second embodiment has only two spaces 2, 3 with the openings 12, 13, respectively, which are exposed to the outside of the counterweight 10. Compared to the first embodiment wherein the drawbar space has three spaces 2, 3, 4, weight reduction of the counterweight 10 due to increased number of spaces is prevented, and the manufacturing process is reduced.

Figure 7:
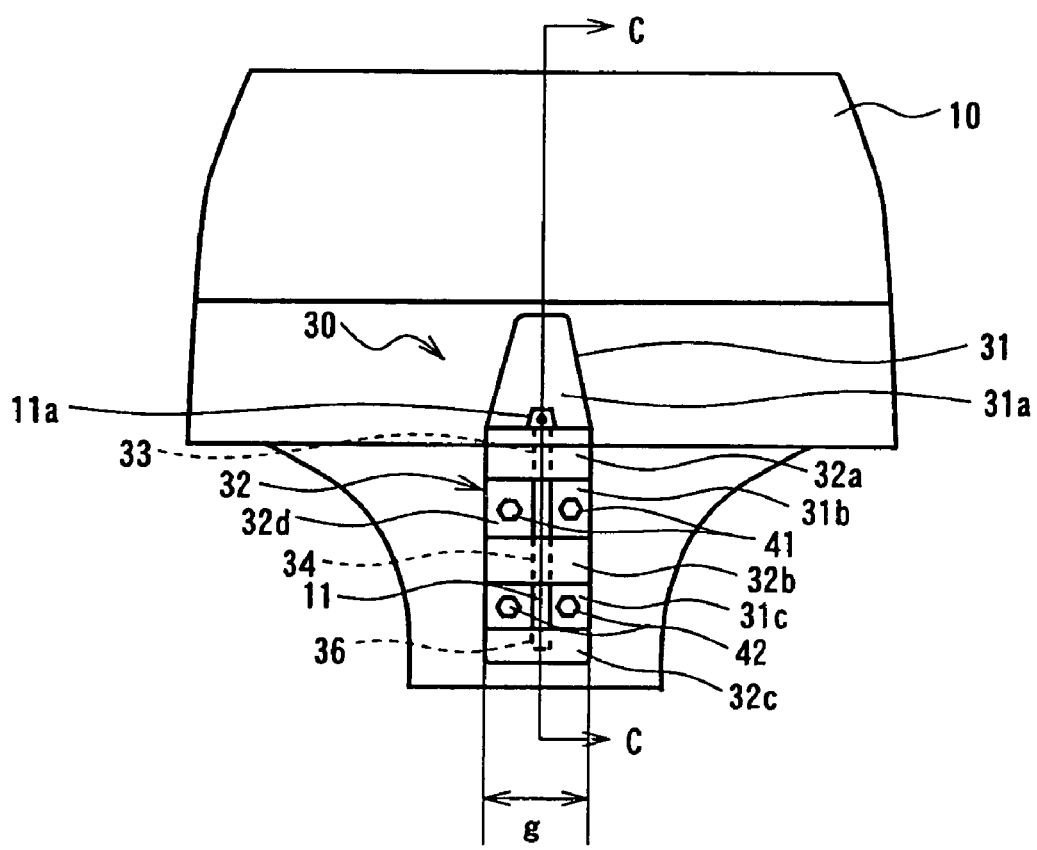
FIG. 7 is a rear view showing a counterweight according to a third preferred embodiment of the present invention.
Figure 8:
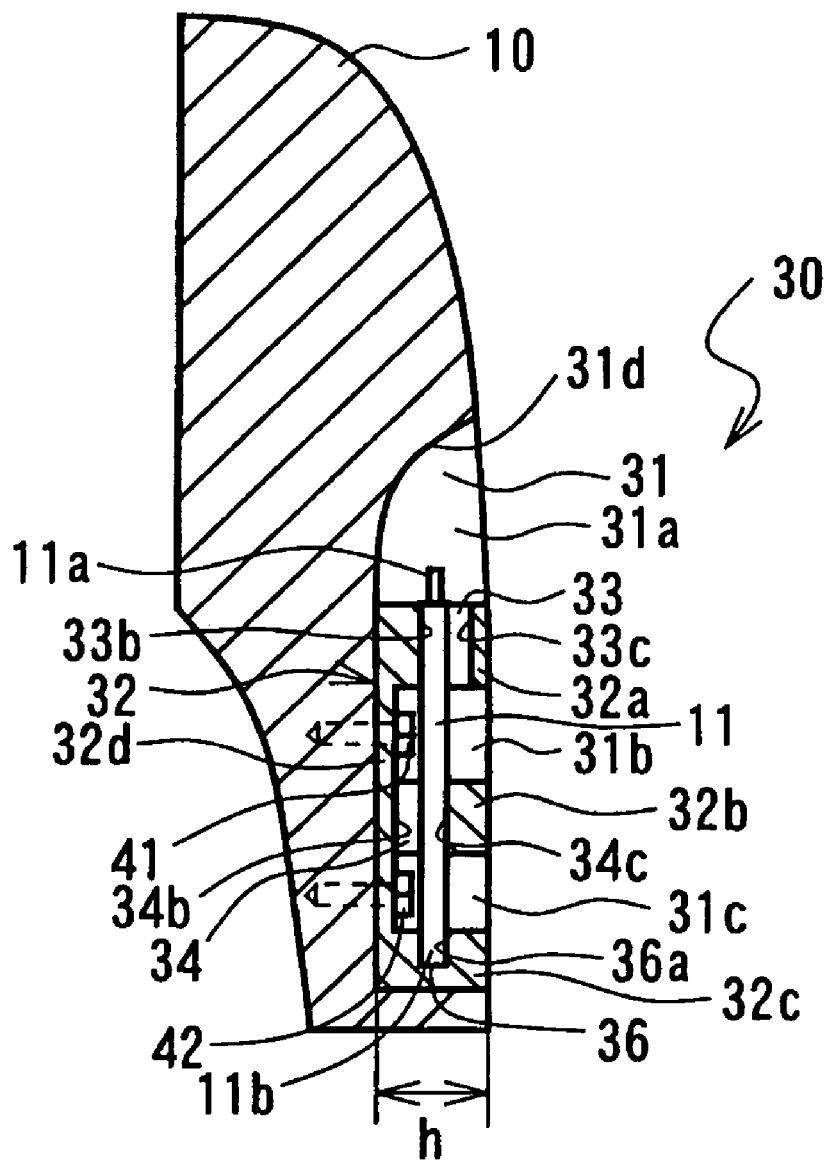
FIG. 8 is a sectional side elevation taken on the line C-C of FIG. 7.

Now, the following will describe a draw gear for an industrial vehicle according to a third preferred embodiment of the present invention with reference to FIGS. 7 and 8. The third embodiment is different from the first embodiment in that the upper, middle, and lower section positioning portions of the first preferred embodiment are formed separately from the counterweight 10. As a matter of explanatory convenience, the drawings for the third embodiment use like reference numerals or symbols to denote like parts or elements of the first embodiment. Explanation of the common structure will be omitted and the modified structure only will be explained.

FIG. 7 shows a draw gear 30 formed in the counterweight 10 provided in the rear of a forklift truck. The counterweight 10 has a relatively large recessed groove 31 formed in the rear part thereof. In the recessed groove 31, a positioning member 32 having a shape of letter E in cross section is fitted with the opening end of the letter E facing rearward. As shown in FIG. 8, the recessed groove 31 has at the top thereof a top wall surface 31d with an arch shape in cross section. The recessed groove 31 has a width g and a depth h that are large enough to receive the positioning member 32 therein.

The positioning member 32 has three horizontal protrusions 32a, 32b, 32c which are spaced vertically from one another. The positioning member 32 also has a vertical connecting portion 32d for connecting the forward ends of the protrusions 32a, 32b, 32c.

The protrusion 32a has a substantially elliptical elongated hole 33 formed therethrough. The protrusion 32b has formed therethrough a substantially elliptical elongated hole 34 which is located in offset relation to, or forward of the above elongated hole 33. The protrusion 32c has a closed-end round hole 36 formed therein.

The positioning member 32 is fixed to the counterweight 10 in the recessed groove 31 by bolts 41, 42. With the positioning member 32 fixed in the recessed groove 31, a space having an opening 31a is formed above the protrusion 32a, a space having an opening 31b is formed between the protrusions 32a and 32b, and a space having an opening 31c is formed between the protrusions 32b and 32c. When drawing the forklift truck, a drawing hook (not shown) is inserted into the opening 31b or 31c to hook the drawing hook on the drawbar 11.

As is the case of the first embodiment, the elongated hole 33 is defined by long-side portions and semicircular portions 33b, 33c which are formed at the opposite ends of the long-side portions. The upper section positioning portion is provided by the semicircular portion 33b which allows the drawbar to be moved in a direction in which the drawbar is drawn. The semicircular portion 33b also positions the drawbar in a direction opposite to the direction in which the drawbar is drawn. Space provided in the elongated hole 33 allows part of the drawbar 11 in the hole 33 to be moved rearward of the vehicle for its removal out from the counterweight 10. The long-side portions of the elongated hole 33 restrict the movement of the drawbar 11 in the direction that intersects with the general direction in which the drawbar 11 is drawn out of the counterweight 10.

The elongated hole 34 is defined by long-side portions and semicircular portions 34b, 34c which are formed at the opposite ends of the long-side portions. The middle section positioning portion is provided by the semicircular portion 34c which allows the drawbar to be moved in the direction opposite to the direction in which the drawbar is drawn. The semicircular portion 34c also positions the drawbar in the direction in which the drawbar is drawn. Space provided in the elongated hole 34 allows part of the drawbar 11 in the hole 34 to be moved forward of the vehicle when removing the drawbar 11 out from the counterweight 10. The long-side portions of the elongated hole 34 perform the same function as the long-side portions of the elongated hole 33.

The closed-end round hole 36 is a hole in which the axial end 11b of the drawbar 11 is fitted. The closed-end round hole 36 has an inner peripheral surface 36a forming the lower section positioning portion which serves to locate the drawbar 11 in its upright position as shown in FIG. 8. Therefore, when the axial end 11b of the drawbar 11 is fitted into the closed-end round hole 36, the drawbar 11 is fitted and completely positioned in the drawbar space.

Operation of the above-described draw gear 30. according to the third embodiment is substantially the same as that of the draw gear 1 according to the first embodiment since the elongated holes 33, 34, the closed-end round hole 36 and the openings 31a, 31b, 31c respectively corresponds to the elongated holes 17, 18, the closed-end round hole 19 and the openings 12, 13, 14. Therefore, description of the operation of the draw gear 30 is omitted.

The draw gear 30 for the industrial vehicle of the third embodiment has the following beneficial effect in addition to the aforementioned effects (1) to (7).

(9) The draw gear 30 of the third embodiment wherein the positioning member 32 having the protrusions 32a, 32b, 32c for the above section portioning portions is provided separately from the counterweight 10 to be fitted in the recessed groove 31 formed in the rear part of the counterweight 10 is easier to form by machining than the draw gears 1 and 20 of the first and second embodiments wherein the protrusions are provided in the counterweight 10 by forming spaces each having an opening. In addition, the provision of the positioning member 32 separately from the counterweight 10 makes it possible for the positioning member 32 to be fitted in the recessed groove 31 only when it is needed for the drawing operation and the positioning member 32 does not have to be fitted in each vehicle, but it may be provided for a plurality of vehicles.

The present invention is not limited to the above-described embodiments but may be variously modified within the scope of the purpose of the invention, as exemplified below.

In the first through third embodiments, the elongated hole is an elliptical hole defined by long-side portions and semicircular portions which are formed at the opposite ends of the long-side portions. In modified embodiments to such embodiments, however, the elongated hole is a substantially rectangular hole defined by long-side portions and short-side portions, and the lower section positioning portion is a substantially square hole, and the drawbar is made of a substantially square bar.

In the first through third embodiments, the drawbar 11 is fitted in the counterweight 10. In modified embodiments to such embodiments, however, the counterweight 10 according to the preset invention includes a frame of the vehicle body.

In the first through third embodiments, the drawbar space having openings formed in the rear part of the counterweight 10 has two or three spaces. In modified embodiments to such embodiments, however, the drawbar space may have one space or four spaces, or more than four spaces.

In the first through third embodiments, the protrusions having the section positioning portions for the drawbar 11 are formed extending horizontally, and the drawbar 11 is inserted vertically through the elongated holes in the protrusions. In modified embodiments to such embodiments, however, the protrusions are formed vertically and the drawbar 11 is inserted laterally. In further modified embodiments to the first through third embodiments, however, the protrusions are formed obliquely and the drawbar 11 is inserted obliquely.

In the first through third embodiments, the round hole for the lower section positioning portion formed in the lower end of the counterweight 10 is a closed-end hole having a predetermined depth. In modified embodiments to such embodiments, however, the round hole may be a through hole.

Figure 9A:
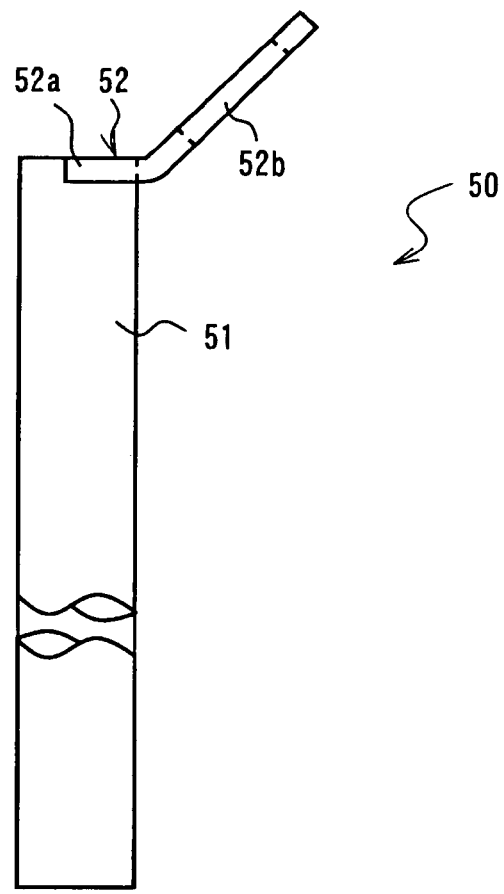
FIG. 9A is a front view showing a drawbar according to another embodiment of the present invention.
Figure 9B:
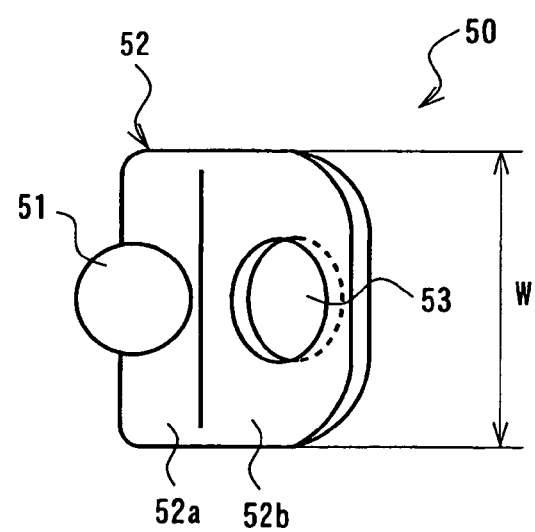
FIG. 9B is a top view showing the drawbar according to another embodiment of the present invention.

Though the drawbar 11 of the above-described three embodiments has the flat head 11a at its tip end, the drawbar 11 may be modified into a drawbar 50 as shown in FIGS. 9A and 9B. The drawbar 50 has a round bar 51 and a L-shaped plate 52 which is fixed at the base portion 52a thereof to the edge of the round bar 51 by welding. As shown in FIG. 9B, the plate 52 has a width W which is larger than the diameter of the round bar 51 and a tilted portion 52b having a round hole 53 formed therethrough. Thus, the provision of the width W which is greater than the diameter of the round bar 51 prevents the plate 52 from falling through the elongated hole in installing the drawbar 50 by inserting it through the elongated hole which forms the upper section positioning portion. In addition, since the tilted portion 52b of the plate 52 is formed extending outward further than the long-side portions of the elongated hole, the drawbar 50 does not fall off the elongated hole by rotation of the drawbar 50 by vibration causes. Such structure of the plate 52 is convenient when the lower section positioning portion is provided by a through hole. Further, installation and removal of the drawbar 50 are accomplished easily by holding and moving the tilted portion 52b in oblique direction for insertion or drawing of the round bar 50.

In the first through third embodiments, the upper and middle section positioning portions are provided by the elliptical elongated holes. In modified embodiments to such embodiments, however, they are provided by round holes whose diameters are larger than that of the drawbar 11.

In the first through third embodiments, the lower section positioning portion is provided by a hole which is bored in the bottom surface in a space in the counterweight 10. In modified embodiments to the first through third embodiments, however, the lower section positioning portion is provided by a hole which is bored in a portion protruding from the above bottom surface in the counterweight 10. The form of the lower section positioning portion is not limited to a hole. The lower section positioning portion may be provided by any kind of shape as far as the lower end of the drawbar 11 is clamped securely by the lower section positioning portion.

Although in the first through third embodiments the depth of the drawbar space formed in the rear part of the counterweight 10 is larger than that of the elongated hole, the depth of the drawbar space may be formed so as to correspond to that of the elongated hole. For example, in a modified embodiment to the first embodiment, the space 2 is formed with a depth corresponding to the forward end of the elongated hole 17, and the spaces 3, 4 are formed with a depth corresponding to the forward end of the elongated hole 18.

In the third embodiment, the positioning member having a shape of the letter E in cross section is provided separately from the counterweight 10, having the upper and middle section positioning portions provided by elongated holes formed in the protrusions, respectively, and the lower section positioning portion by a round hole. In a modified embodiment to the third embodiment, the positioning member provided separately from the counterweight 10 may have a shape of the letter U in cross section so as to have the upper protrusion and the lower protrusion. The protrusions have formed therein elongated holes for the upper and middle section positioning portions. In addition, the upper and lower protrusions may be provided separately from each other.

The industrial vehicle to which the draw gear of the present invention is applicable is not limited to the forklift truck, but includes other types of industrial vehicle such as shovel loader.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A draw gear for an industrial vehicle comprising:
    a drawbar space formed in a rear part of a counterweight of the industrial vehicle;
    a drawbar installed in the drawbar space;
    an upper section positioning portion provided in the drawbar space for allowing the drawbar to be moved in a first direction in which the drawbar is drawn and also for positioning the drawbar in a second direction opposite to the first direction, wherein the first direction is rearward of the counterweight, and the upper section positioning portion positioning the drawbar forward of the counterweight;
    a middle section positioning portion provided in the drawbar space for allowing the drawbar to be moved in the second direction and also for positioning the drawbar in the first direction, wherein the middle section positioning portion positioning the drawbar rearward of the counterweight; and
    a lower section positioning portion provided in the drawbar space for positioning the drawbar at least in the second direction, wherein the lower section positioning portion positioning the drawbar at least forward of the counterweight, and
    wherein an opening is formed at least on an upper side of the drawbar space for allowing the drawbar to be drawn out of the counterweight.

2. The draw gear according to claim 1, wherein an upper protrusion and a lower protrusion are formed in the drawbar space, the upper protrusion having a first elongated hole in which the upper section positioning portion is formed for positioning the drawbar forward of the counterweight, the lower protrusion having a second elongated hole in which the middle section positioning portion is formed for positioning the drawbar rearward of the counterweight, the first elongated hole and the second elongated hole being formed in offset relation to each other forward or rearward of the counterweight.

3. The draw gear according to claim 1, wherein a positioning portion is formed in the drawbar space for positioning the drawbar in a direction that intersects with the first direction.

4. The draw gear according to claim 1, wherein the upper section positioning portion, the middle section positioning portion and the lower section positioning portion are spaced vertically from one another.

5. The draw gear according to claim 1, wherein an upper protrusion and a lower protrusion are formed in the drawbar space, the protrusions having elongated holes, respectively, in which the upper section positioning portion and the middle section positioning portion are formed.

6. The draw gear according to claim 5, wherein the elongated hole has a substantially elliptical hole defined by long-side portions and semicircular portions which are formed at the opposite ends of the long-side portions, the lower section positioning portion having a substantially round hole, the drawbar being made of a substantially round bar.

7. The draw gear according to claim 5, wherein the elongated hole has a substantially rectangular hole defined by long-side portions and short-side portions, the lower section positioning portion having a substantially square hole, the drawbar being made of a substantially square bar.

8. The draw gear according to claim 5, wherein the protrusions having the elongated holes are formed separately from the counterweight, the protrusions being fitted in the counterweight.

9. The draw gear according to claim 1, wherein the drawbar space has an opening which is exposed to an outside of the counterweight between the upper section positioning portion and the middle section positioning portion, and/or the drawbar space has an opening which is exposed to the outside between the middle section positioning portion and the lower section positioning portion.

* * * * *

UNITED STATES PATENT AND TRADEMARK OFFICE
CERTIFICATE OF CORRECTION

PATENT NO. : 7,419,178 B2
APPLICATION NO. : 11/388261
DATED : September 2, 2008
INVENTOR(S) : Daisuke Inoue It is certified that error appears in the above-identified patent and that said Letters Patent is hereby corrected as shown below:

Column 1, line 20, please delete "for preventing drawbar" and insert therefore -- for preventing the drawbar --;

Column 1, line 40, please delete "inserted in oblique direction" and insert therefore -- inserted in an oblique direction --;

Column 3, lines 18-19, 23, 27-28, 36, 43 and 46-47, please delete "cross section" and insert therefore -- cross-section --;

Column 5, line 2, please delete "the drawbar 11 being held" and insert therefore -- the drawbar 11 is held --;

Column 5, line 6, please delete "is placed in upright position" and insert therefore -- is placed in an upright position --;

Column 5, lines 15-16, please delete "the drawbar space being completed" and insert therefore -- the drawbar space is completed --;

Column 5, line 66, please delete "(5) Inserting" and insert therefore -- (5) By inserting --;

Column 6, line 2, please delete "operation in emergency" and insert therefore -- operation in an emergency --;

Column 6, lines 36-37 and 41, please delete "cross section" and insert therefore -- cross-section --;

Column 7, line 19, please delete "the drawbar 11 in the hole 18" and insert therefore -- the drawbar 11 in the hole 21 --;

Column 8, lines 13-14, please delete "the drawbar space being completed" and insert therefore -- the drawbar space is completed --;

Column 8, line 18, please delete "into the opening 13, the" and insert therefore -- into the opening 13, and the --;

UNITED STATES PATENT AND TRADEMARK OFFICE
CERTIFICATE OF CORRECTION

PATENT NO. : 7,419,178 B2
APPLICATION NO. : 11/388261
DATED : September 2, 2008
INVENTOR(S) : Daisuke Inoue It is certified that error appears in the above-identified patent and that said Letters Patent is hereby corrected as shown below:

Column 8, lines 47 and 50, please delete "cross section" and insert therefore
-- cross-section --;

Column 8, line 47, please delete "having a shape of letter E" and insert therefore
-- having a shape of the letter E --;

Column 9, line 7, please delete "As is the case" and insert therefore -- As in the case --;

Column 9, line 44, please delete "draw gear 30. according" and insert therefore -- draw gear 30 according --;

Column 10, lines 58-59, please delete "tilted portion 52b in oblique direction" and insert therefore -- tilted portion 52b in an oblique direction --;

Column 11, lines 19 and 26, please delete "cross section" and insert therefore
-- cross-section --; and Column 11, line 33, please delete "such as shovel loader" and insert therefore -- such as a shovel loader --.

Signed and Sealed this

First Day of September, 2009

David J. Kappos
*Director of the United States Patent and Trademark Office*